(12) United States Patent
Sun et al.

(10) Patent No.: US 11,965,861 B2
(45) Date of Patent: Apr. 23, 2024

(54) EQUIVALENT ACCELERATION METHOD OF CREEP LOADS BASED ON CONSISTENT FAILURE MODE

(71) Applicant: NANJING UNIVERSITY OF AERONAUTICS AND ASTRONAUTICS, Nanjing (CN)

(72) Inventors: Zhigang Sun, Nanjing (CN); Xu Zhao, Nanjing (CN); Yingdong Song, Nanjing (CN); Xuming Niu, Nanjing (CN); Yaning Chang, Nanjing (CN); Qiuhong Peng, Nanjing (CN)

(73) Assignee: NANJING UNIVERSITY OF AERONAUTICS AND ASTRONAUTICS, Nanjing (CN)

( * ) Notice: Subject to any disclaimer, the term of this patent is extended or adjusted under 35 U.S.C. 154(b) by 240 days.

(21) Appl. No.: 17/743,369

(22) Filed: May 12, 2022

(65) Prior Publication Data
US 2022/0268677 A1 Aug. 25, 2022

Related U.S. Application Data

(63) Continuation of application No. PCT/CN2021/129426, filed on Nov. 9, 2021.

(30) Foreign Application Priority Data

Dec. 24, 2020 (CN) .......................... 202011542195.4

(51) Int. Cl.
*G01N 3/18* (2006.01)
*G01N 3/02* (2006.01)
*G01N 3/36* (2006.01)

(52) U.S. Cl.
CPC ................. *G01N 3/18* (2013.01); *G01N 3/02* (2013.01); *G01N 2203/0017* (2013.01);
(Continued)

(58) Field of Classification Search
CPC .. G01N 3/08; G01N 3/18; G01N 3/28; G01N 3/02; G01N 2203/0017; G01N 2203/0048;
(Continued)

(56) References Cited

U.S. PATENT DOCUMENTS

2014/0379280 A1 12/2014 Arai et al.
2019/0354889 A1* 11/2019 Zhang ...................... G06N 7/01

FOREIGN PATENT DOCUMENTS

CN 103712865 A 4/2014
CN 104809273 A 7/2015
(Continued)

OTHER PUBLICATIONS

First Office Action issued in counterpart Chinese Patent Application No. 202011542195.4, dated Aug. 25, 2021.
(Continued)

*Primary Examiner* — Brandi N Hopkins
(74) *Attorney, Agent, or Firm* — Westbridge IP LLC

(57) ABSTRACT

Disclosed is an equivalent acceleration method of creep loads based on a consistent failure mode. The equivalent acceleration method includes obtaining corresponding tensile strengths; obtaining corresponding creep rupture time; establishing rupture time law, minimum creep rate law and rupture strain law; calculating the value of parameter p in creep damage accumulation model; and dividing the failure mode consistency interval of creep load under variable temperature and variable load. The damage caused by the creep load in the failure mode consistency interval is calculated by using the multi-grade variable temperature and variable load creep nonlinear damage accumulation model, the damage is accelerated to the maximum creep load state in the failure mode consistency interval according to the
(Continued)

principle of damage equivalence, and finally the equivalent acceleration of creep load is realized.

6 Claims, 7 Drawing Sheets

(52) U.S. Cl.
CPC ........... *G01N 2203/0048* (2013.01); *G01N 2203/0071* (2013.01); *G01N 2203/0073* (2013.01); *G01N 2203/0226* (2013.01)

(58) Field of Classification Search
CPC ... G01N 2203/0071; G01N 2203/0073; G01N 2203/0226; G01N 3/36; G01N 3/40; G01N 3/60; G06F 17/50; G06F 30/20; G01M 15/00
See application file for complete search history.

(56) References Cited

FOREIGN PATENT DOCUMENTS

| CN | 107677547 | A | | 2/2018 | |
| CN | 109142083 | A | | 1/2019 | |
| CN | 110411863 | A | | 11/2019 | |
| CN | 110705019 | A | * | 1/2020 | ............ G01M 15/02 |
| CN | 110705019 | A | | 1/2020 | |
| CN | 111351696 | A | | 6/2020 | |
| CN | 112730092 | A | | 4/2021 | |
| CN | 112730061 | B | * | 6/2022 | ............ G01N 3/08 |
| JP | 2012202908 | A | | 10/2012 | |

OTHER PUBLICATIONS

Pan, Prediction of elevated-temperature creep life in 9Cr—1Mo steel by different methods, Master Thesis submitted to Northwest University, dated Jun. 30, 2017.

Second Office Action issued in counterpart Chinese Patent Application No. 202011542195.4, dated Mar. 9, 2022.

Zhong, Research on Accelerated Fatigue Spectrum Editing Methods of Multi-axial Random Vibration, Master Degree Thesis submitted to Southwest Jiaotong University, dated Jun. 30, 2017.

* cited by examiner (a)

(b)

EQUIVALENT ACCELERATION METHOD OF CREEP LOADS BASED ON CONSISTENT FAILURE MODE

CROSS-REFERENCE TO RELATED APPLICATIONS

The present application is a continuation of International Application No. PCT/CN 2021/129426, filed on Nov. 19, 2021, which claims priority to Chinese Patent Application No. 202011542195.4, filed on Dec. 24, 2020. The contents of the above-mentioned applications are incorporated herein by reference in their entireties.

TECHNICAL FIELD

The application relates to a creep load equivalent acceleration method, and in particular to an equivalent acceleration method of creep loads based on a consistent failure mode.

BACKGROUND

Aeroengines, gas turbines and other engineering structures work in high temperatures and high stress environment for a long time, power states of which change all the time, inevitably suffer from the creep load under variable temperatures and variable loads, and eventually lead to failure. However, the service life of engineering structures is often as long as thousands or even tens of thousands of hours. If the creep load under actual working conditions is used to test its service life and reliability, there are disadvantages such as long test time and high costs. Therefore, it is necessary to ensure the equivalent acceleration of creep loads under the premise of the consistent failure mode to shorten the test time, which means accelerating small creep loads to large creep load states based on the principle of a consistent failure mode and damage equivalence. However, the current creep load equivalent acceleration method does not follow the principle of the consistent failure mode, and the adopted damage equivalent acceleration method has low accuracy, which makes the test results have a large deviation from the actual engineering application period.

SUMMARY

The objective of the present application is to provide an equivalent acceleration method of creep loads based on the consistent failure mode, so as to perform equivalent acceleration of creep loads more simply and accurately.

To achieve the above objective, the application adopts the following technical scheme:

an equivalent acceleration method of creep loads based on consistent failure mode, including the following steps:

S1, obtaining corresponding tensile strengths $\sigma_{bi}$ at different temperatures $T_i$ through high-temperature tensile tests of materials, wherein i=1, 2, 3 . . . , n;

S2, obtaining corresponding creep rupture time $t_f$, rupture strain $\varepsilon_f$ and a minimum creep rate $\dot{\varepsilon}_m$ at different stress temperatures $(\sigma_i, T_i)$ through a high temperature creep test of materials;

S3, establishing a rupture time law, a minimum creep rate law and a rupture strain law, and then obtaining a creep damage tolerance factor under a corresponding stress-temperature $(\sigma_i, T_i)$ combination;

S4, obtaining a creep duration $t_i$ of each grade of stress-temperature $(\sigma_i, T_i)$ combination through a creep test of materials under variable temperatures and variable loads;

S5, calculating a value of parameter p in a creep damage accumulation model by combining the tensile strengths $\sigma_{bi}$ at all grades of temperature obtained in S1, rupture time $t_{fi}$ at all grades of stress-temperature $(\sigma_i, T_i)$ combination obtained in S2 and the creep duration $t_i$ at all grades obtained in S4 based on a multi-grade variable temperatures and variable loads creep nonlinear damage accumulation mode;

S6, calculating damage tolerance factor value λ corresponding to each grade of creep load according to the creep damage tolerance factor obtained in S3, and dividing failure mode consistency interval of the creep load with variable temperatures and variable loads according to the damage tolerance factor value λ; and S7, calculating the damage caused by the creep load in the failure mode consistency interval respectively by using the multi-grade variable temperature and variable load creep nonlinear damage accumulation model, and accelerating the caused damage to the maximum creep load state in the failure mode consistency interval according to the principle of damage equivalence, and finally realizing the equivalent acceleration of creep load.

In S1, the high-temperature tensile test of materials is carried out on an electro-hydraulic servo fatigue tester.

In S2, the high-temperature creep test of materials is carried out on a creep tester, and a series of creep tests under different stress-temperature $(\sigma_i, T_i)$ combinations are carried out.

In S3, based on the creep rupture time $t_f$, the rupture strain $\varepsilon_f$, the minimum creep rate $\dot{\varepsilon}_m$, the tensile strength $\sigma_b$, and the temperature T obtained in S2, the rupture time law $$\frac{\sigma}{\sigma_b} = \exp\left[-k_1\left[t_f * e^{-\frac{Q_c^*}{RT}}\right]^u\right],$$

the minimum creep rate law $$\frac{\sigma}{\sigma_b} = \exp\left[-k_2\left[\dot{\varepsilon}_m * e^{\frac{Q_c^*}{RT}}\right]^v\right]$$

and rupture strain law $$\varepsilon_f = \frac{\varepsilon_{fmax} + \varepsilon_{fmin}(\dot{\varepsilon}_m/\dot{\varepsilon}_{m,cr})^{-\alpha}}{1 + (\dot{\varepsilon}_m/\dot{\varepsilon}_{m,cr})^{-\alpha}}$$

are established, and then the creep damage tolerance factor $\lambda = \varepsilon_f/(\dot{\varepsilon}_m * t_f)$ under the corresponding stress-temperature combination $(\sigma_i, T_i)$ is obtained;

wherein e is a natural index, $k_1$, $k_2$, u, v, α are fitting parameters, R is a gas constant R=8.314 J/(mol*K), $Q_c^*$ is creep activation energy, $\varepsilon_{f\ max}$ and $\varepsilon_{f\ min}$ are a maximum rupture strain and a minimum rupture strain respectively, and $\dot{\varepsilon}_{m,cr}$ is the median rupture strain, a minimum creep rate value corresponding to $$\varepsilon_f = \frac{\varepsilon_{fmax} + \varepsilon_{fmin}}{2}.$$

In S4, the creep test of materials under variable temperature and variable load is carried out on a creep tester, and the creep test under variable temperatures and variable loads under multi-grade stress-temperature combination is carried out until the creep rupture of the materials occurs, and the creep duration under each grade of stress-temperature $(\sigma_i, T_i)$ combination is obtained.

In S4, the creep test of materials under variable temperatures and variable loads adopts the manual or computer control mode to realize the change of stress and temperatures.

In S5, the multi-grade variable temperature and variable load creep nonlinear damage accumulation model is:

$$D = \left(\left(\left(\left(\frac{t_1}{t_{f1}}\right)^{\varphi_{1,2}} + \frac{t_2}{t_{f2}}\right)^{\varphi_{2,3}} + \frac{t_3}{t_{f3}}\right)^{\varphi_{3,4}} + \ldots + \frac{t_{n-1}}{t_{f n-1}}\right)^{\varphi_{n-1,n}} + \frac{t_n}{t_{fn}} \text{ wherein}$$

$$\varphi_{n-1,n} = \ln\left(\frac{-\ln(\sigma_n/\sigma_{bn})}{-p}\right) \bigg/ \ln\left(\frac{-\ln(\sigma_{n-1}/\sigma_{bn-1})}{-p}\right).$$

In S5, p takes an average value of results obtained from multiple tests.

In S6, when $1<\lambda<2.5$, the failure mode is a grain boundary cavity, when $2.5<\lambda<5$, the failure mode is necking, and when $\lambda>5$, the failure mode is unstable microstructure dominated by coarse precipitates; the adjacent creep loads with damage tolerance factors between $1<\lambda<2.5$, $2.5<\lambda<5$, and $\lambda>5$ are equivalently accelerated to a maximum creep state of uniform damage interval, so as to realize a division of a uniform interval of the failure mode of the creep loads with variable temperatures and variable loads.

Advantages: compared with the prior art, the technical scheme has the following advantages:

1. The equivalent acceleration method of creep loads based on consistent failure modes proposed by the application only needs to carry out a high-temperature tensile test, a high-temperature creep test and a certain number of variable temperature and variable load creep tests to obtain the tensile strength $\sigma_{bi}$ at the corresponding temperature, the creep rupture time $t_f$ at the corresponding stress temperature, the rupture strain $\varepsilon_f$, the minimum creep rate $\dot{\varepsilon}_m$ and the creep duration $t_i$ of each grade of loads, with few required parameters, simple tests and low costs;
2. The equivalent acceleration method of creep loads based on consistent failure modes proposed by the application follows the principle of failure mode consistency, which can ensure that the failure mode of creep load is consistent before and after acceleration;
3. The equivalent acceleration method of creep loads based on consistent failure mode proposed by the application adopts the nonlinear creep damage accumulation model, follows the influence of the creep load sequence and interaction, and can accurately calculate the damage caused by the creep load with variable temperatures and variable loads with high accuracy.

DETAILED DESCRIPTION OF THE EMBODIMENTS

The present application will be further explained with reference to the accompanying figures.

The application discloses a creep load equivalent acceleration method based on consistent failure mode, which comprises the following steps:

S1, obtaining corresponding tensile strengths $\sigma_{bi}$ at different temperatures $T_i$ through high-temperature tensile tests of materials, where $i=1, 2, 3 \ldots, n$;

S2, obtaining the corresponding creep rupture time $t_f$, rupture strain $\varepsilon_f$ and minimum creep rate $\dot{\varepsilon}_m$ at different stress temperatures $(\sigma_i, T_i)$ through high temperature creep test of materials;

S3, based on the creep rupture time $t_f$, the rupture strain $\varepsilon_f$, the minimum creep rate $\dot{\varepsilon}_m$, the tensile strength $\sigma_b$ and the temperature $\sigma_b$ obtained in S2, establishing the rupture time law $$\frac{\sigma}{\sigma_b} = \exp\left[-k_1\left[t_f * e^{-\frac{Q_c^*}{RT}}\right]^u\right],$$

minimum creep rate law $$\frac{\sigma}{\sigma_b} = \exp\left[-k_2\left[\dot{\varepsilon}_m * e^{\frac{Q_c^*}{RT}}\right]^v\right]$$

and rupture strain law $$\varepsilon_f = \frac{\varepsilon_{fmax} + \varepsilon_{fmin}(\dot{\varepsilon}_m/\dot{\varepsilon}_{m,cr})^{-\alpha}}{1 + (\dot{\varepsilon}_m/\dot{\varepsilon}_{m,cr})^{-\alpha}},$$

and then obtaining the creep damage tolerance factor $\lambda = \varepsilon_f/(\dot{\varepsilon}_m * t_f)$ under the corresponding stress-temperature $(\sigma_i, T_i)$ combination;

where e is a natural index, $k_1$, $k_2$, u, v, α are fitting parameters, R is a gas constant R=8.314 J/(mol*K), $Q_c^*$ is creep activation energy, $\varepsilon_{f\,max}$ and $\varepsilon_{f\,min}$ are the maximum rupture strain and the minimum rupture strain respectively, and $\dot{\varepsilon}_{m,cr}$ is the median rupture strain, the minimum creep rate value corresponding to $$\varepsilon_f = \frac{\varepsilon_{fmax} + \varepsilon_{fmin}}{2}.$$

Figure 1:
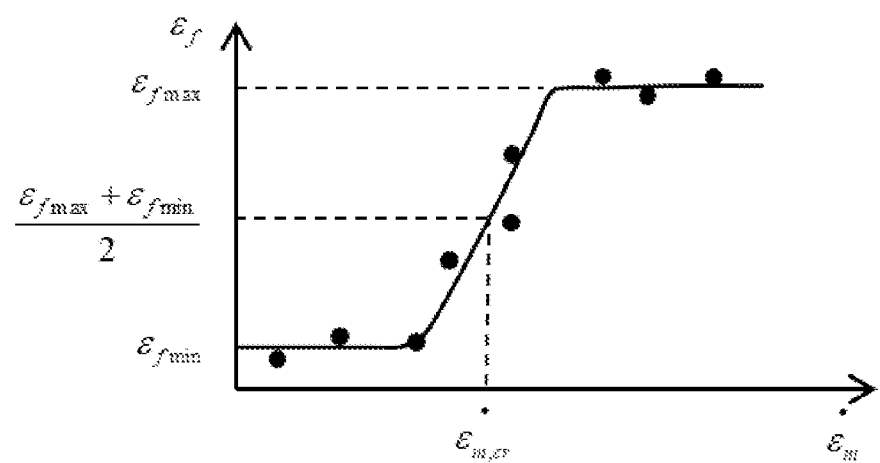
FIG. 1 is a schematic diagram of rupture strain fitting in an embodiment of the present application.

The fitting diagram of rupture strain with minimum creep rate is shown in FIG. 1.

Figure 2:
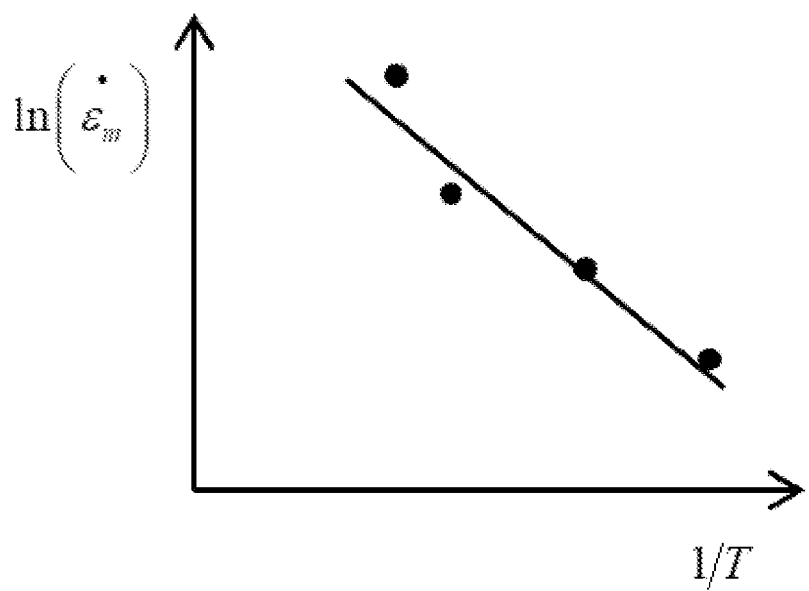
FIG. 2 is a fitting diagram of a minimum creep rate with 1/T in an embodiment of the present application.

The creep activation energy $Q_c^*$ can be obtained by fitting the test results of the minimum creep rate $\dot{\varepsilon}_m$ with the reciprocal 1/T of the test temperature. The fitting formula is $$\dot{\varepsilon}_m = A\left(\frac{\sigma}{\sigma_b}\right)^n \exp\left[\frac{-Q_c^*}{RT}\right],$$

the fitting diagram of the minimum creep rate with 1/T is shown in FIG. 2, and the creep activation energy $Q_c^*$ can be calculated from the fitted slope value $$\frac{-Q_c^*}{R}.$$

Figure 3:
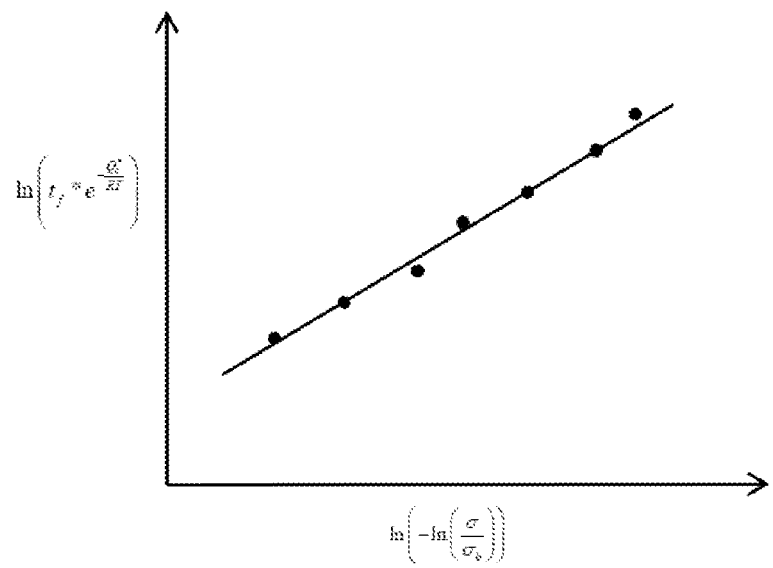
FIG. 3 is a schematic diagram of rupture time fitting in an embodiment of the present application.
Figure 4:
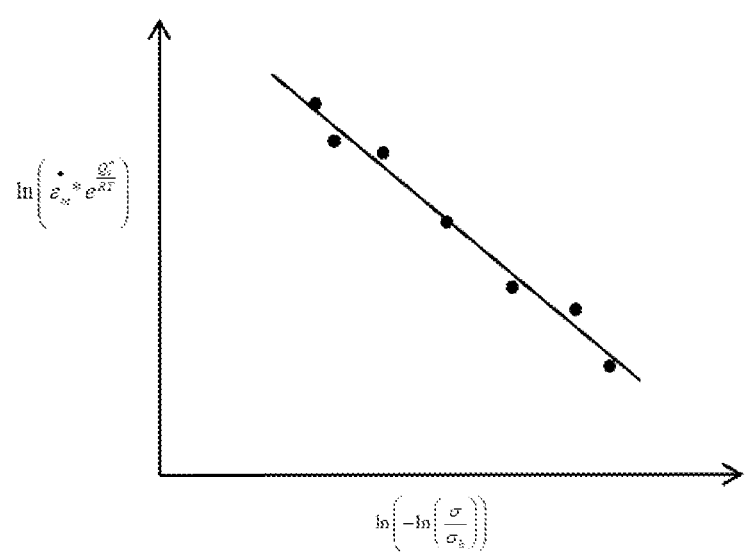
FIG. 4 is a schematic diagram of minimum creep rate fitting in an embodiment of the present application.

The schematic diagrams of rupture time and minimum creep rate fitted according to test data are shown in FIG. 3 and FIG. 4 respectively.

According to the established rupture time law $$\frac{\sigma}{\sigma_b} = \exp\left[-k_1\left[t_f * e^{-\frac{Q_c^*}{RT}}\right]^u\right],$$

minimum creep rate law $$\frac{\sigma}{\sigma_b} = \exp\left[-k_2\left[\dot{\varepsilon}_m * e^{\frac{Q_c^*}{RT}}\right]^v\right]$$

and rupture strain law $$\varepsilon_f = \frac{\varepsilon_{fmax} + \varepsilon_{fmin}(\dot{\varepsilon}_m/\dot{\varepsilon}_{m,cr})^{-\alpha}}{1 + (\dot{\varepsilon}_m/\dot{\varepsilon}_{m,cr})^{-\alpha}},$$

the rupture time $t_f$, minimum creep rate $\dot{\varepsilon}_m$ and rupture strain $\varepsilon_f$ under any stress-temperature combination can be obtained, and the corresponding damage tolerance factor λ value could be obtained by using creep damage tolerance factor $\lambda = \varepsilon_f/(\dot{\varepsilon}_m * t_f)$.

S4, the creep duration $t_i$ of each grade of stress-temperature $(\sigma_i, T_i)$ combination is obtained by carrying out the creep test under variable temperatures and variable loads under multi-grade stress-temperature combination until the creep rupture of the material occurs.

S5, based on the multi-grade variable temperature and variable load creep nonlinear damage accumulation model:

$$D = \left(\left(\left(\left(\frac{t_1}{t_{f1}}\right)^{\varphi_{1,2}} + \frac{t_2}{t_{f2}}\right)^{\varphi_{2,3}} + \frac{t_3}{t_{f3}}\right)^{\varphi_{3,4}} + \ldots + \frac{t_{n-1}}{t_{fn-1}}\right)^{\varphi_{n-1,n}} + \frac{t_n}{t_{fn}}$$

where $$\varphi_{n-1,n} = \ln\left(\frac{-\ln(\sigma_n/\sigma_{bn})}{-p}\right) \bigg/ \ln\left(\frac{-\ln(\sigma_{n-1}/\sigma_{bn-1})}{-p}\right);$$

combining the tensile strength $\sigma_{bi}$ at each grade of temperature obtained in S1, the rupture time $t_{fi}$ at all grades of stress-temperature $(\sigma_i, T_i)$ combination obtained in S2 and the creep duration $t_i$ at each grade of variable temperature and variable load obtained in S4, the value of parameter p in the creep damage accumulation model is calculated; in order to reduce the error, p can be an average value of results obtained from multiple tests.

S6, calculating a damage tolerance factor value λ corresponding to each grade of creep load according to the creep damage tolerance factor obtained in S3, and dividing the failure mode consistency interval of the creep load with variable temperatures and variable loads according to the damage tolerance factor value λ; when 1<λ<2.5, the failure mode is grain boundary cavity, when 2.5<λ<5, the failure mode is necking, and when λ>5, the failure mode is unstable microstructure dominated by coarse precipitates; the adjacent creep loads with damage tolerance factors between 1<λ<2.5, 2.5<λ<5, and λ>5 are equivalently accelerated to a maximum creep state of uniform damage interval, so as to realize a division of a uniform interval of failure mode of the creep loads with variable temperatures and variable loads.

Figure 5:
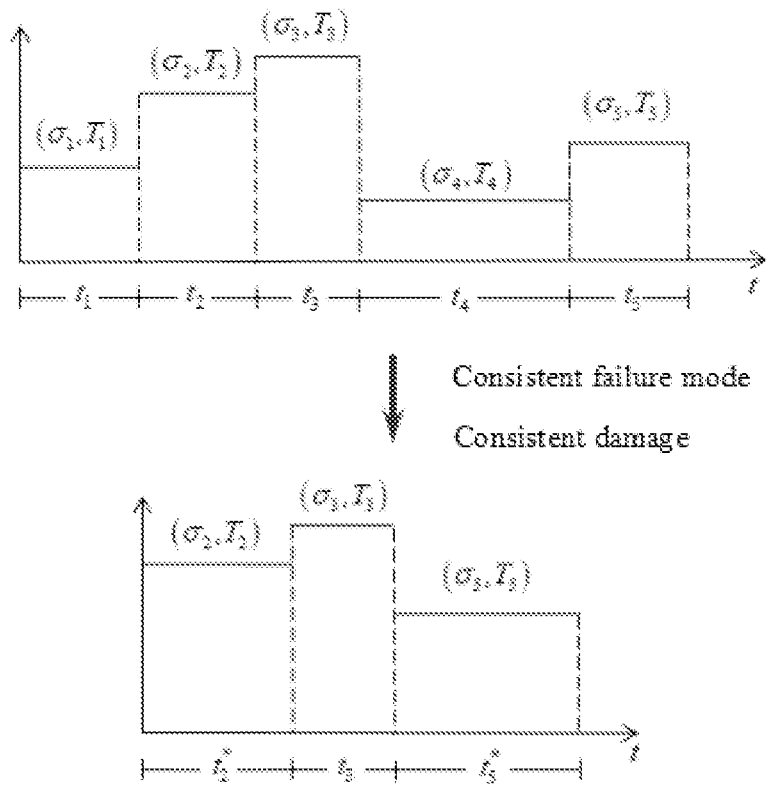
FIG. 5 is a schematic diagram of an equivalent acceleration method of creep loads with the consistent failure mode in an embodiment of the present application.

S7, calculating the damage caused by the creep load in the failure mode consistency interval respectively by using the multi-grade variable temperature and variable load creep nonlinear damage accumulation model, and accelerating the caused damage to the maximum creep load state in the failure mode consistency interval according to the principle of damage equivalence, and finally realizing the equivalent acceleration of creep load, the schematic diagram of which is shown in FIG. 5.

Figure 6:
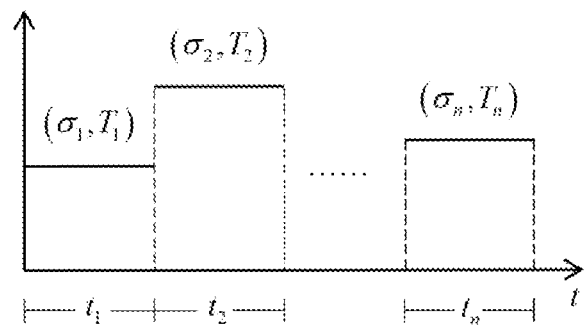
FIG. 6 is a schematic diagram of creep load with multi-grade variable temperatures and variable loads in an embodiment of the present application.

The high-temperature tensile test of materials is carried out on the electro-hydraulic servo fatigue tester, and the high-temperature creep test of materials and the creep test of materials under variable temperature and variable load are carried out on the creep tester. The creep test of materials under variable temperatures and variable loads adopts the manual or computer control mode to realize the change of stress and temperature. The objective of high temperature tensile test of materials is to obtain the corresponding tensile strength $\sigma_{bi}$ of materials at temperature $T_i$. High-temperature creep tests of materials are carried out under a series of different stress-temperature $(\sigma_i, T_i)$ combinations, until the creep rupture of the materials occurs, and the corresponding creep rupture time $t_f$, rupture strain $\varepsilon_f$ and minimum creep rate $\dot{\varepsilon}_m$ under different stress-temperature conditions are obtained. The creep test of materials under variable temperatures and variable loads is carried out on the creep tester, and a certain number of creep tests under variable temperatures and variable loads under multi-grade stress-temperature combination are carried out, and the creep duration of each grade of temperature-stress $(\sigma_i, T_i)$ combination is $t_i$, until the creep rupture of materials occurs. The applied creep load with multi-grade variable temperatures and variable loads is shown in FIG. 6.

The following will be further explained with embodiments.

In an embodiment, the equivalent acceleration method of creep loads based on consistent failure mode proposed by the application is applied to the creep load equivalent acceleration of stainless steel materials, which includes the following steps:

S11, carrying out high temperature tensile tests of materials at 100° C., 139° C. and 190° C., and the tensile strengths $\sigma_b$ are 450 MPa, 432 MPa and 405 MPa respectively.

S12, carrying out high temperature creep tests with stress of 200 MPa, 250 MPa and 300 MPa at 100° C., 139° C. and 190° C. respectively, and obtaining the corresponding creep rupture time $t_f$, rupture strain $\varepsilon_f$ and minimum creep rate $\dot{\varepsilon}_m$.

S13, based on the test conditions such as the minimum creep rate $\dot{\varepsilon}_m$ obtained in S12 and the stress $\sigma$ and temperature T, obtaining the slope of the fitted straight line $$\frac{-Q_c^*}{R} = -18056$$

through fitting the relationship between the minimum creep rate and 1/T by $$\dot{\varepsilon}_m = A(\sigma)^n \exp\left[\frac{-Q_c^*}{RT}\right].$$

According to the creep rupture time $t_f$, rupture strain $\varepsilon_f$, minimum creep rate $\dot{\varepsilon}_m$ and tensile strength $\sigma_b$, combined with the test conditions such as stress $\sigma$ and temperature T, the rupture time law is $$\frac{\sigma}{\sigma_b} = \exp\left[-20.6\left[t_f * e^{\frac{Q_c^*}{RT}}\right]^{0.13}\right],$$

minimum creep rate law is $$\frac{\sigma}{\sigma_b} = \exp\left[-33\left[\dot{\varepsilon}_m * e^{\frac{Q_c^*}{RT}}\right]^{-0.13}\right]$$

and rupture strain law is $$\varepsilon_f = \frac{0.8596 + 0.0104(\dot{\varepsilon}_m/(1.3*10^{-6}))^{-1.3447}}{1 + (\dot{\varepsilon}_m/(1.3*10^{-6}))^{-1.3447}}.$$

Figure 7:
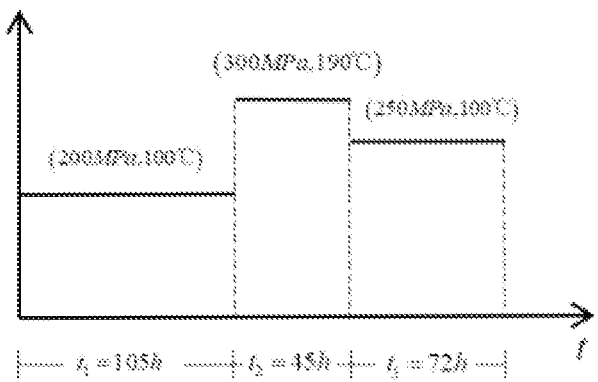
FIG. 7 is a three-grade creep load with variable temperatures and variable loads in an embodiment of the present application.
Figure 7:
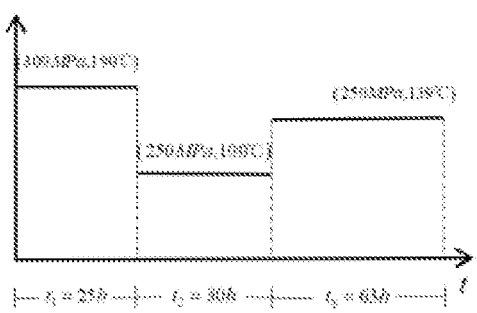

S14, carrying out two groups of three-grade creep tests with variable temperatures and variable loads until rupture occurs, and recording the creep duration $t_i$ corresponding to each grade of load. The two groups of three-grade creep tests with variable temperature and variable load are shown in FIG. 7.

S15, using the third-grade nonlinear damage accumulation model $$D = \left(\left(\frac{t_1}{t_{f1}}\right)^{\varphi_{1,2}} + \frac{t_2}{t_{f2}}\right)^{\varphi_{2,3}} + \frac{t_3}{t_{f3}},$$

Where $$\varphi_{1,2} = \ln\left(\frac{-\ln(\sigma_2/\sigma_{b2})}{-p}\right) \bigg/ \ln\left(\frac{-\ln(\sigma_1/\sigma_{b1})}{-p}\right),$$

$$\varphi_{2,3} = \ln\left(\frac{-\ln(\sigma_3/\sigma_{b3})}{-p}\right) \bigg/ \ln\left(\frac{-\ln(\sigma_2/\sigma_{b2})}{-p}\right),$$

when rupture occurs, D=1. According to the tensile strength $\sigma_b$ obtained in S11, the rupture time $t_f$ obtained in S12, and the load duration $t_i$ of each grade in S14, the parameters p in the damage accumulation model could be obtained as 0.54 and 0.56, and the average value is taken as p=0.55.

Figure 8:
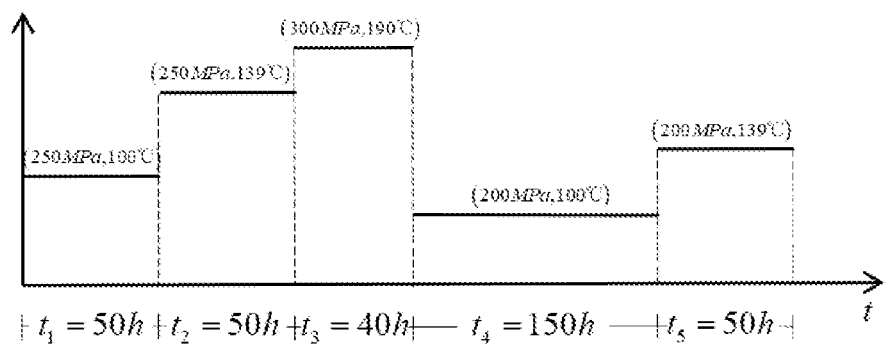
FIG. 8 is a five-grade creep load with variable temperatures and variable loads in an embodiment of the present application.

S16, for the five-grade creep load shown in FIG. 8, according to the law of damage tolerance factor established in S13, the damage tolerance factor values $\lambda$ corresponding to each grade of creep load could be calculated as 1.3, 2.1, 3.7, 5.4 and 6.2, respectively. It can be seen that the first and second grade creep loads are in the same failure mode interval, and the fourth and fifth grade creep loads are in the same failure mode interval.

Figure 9:
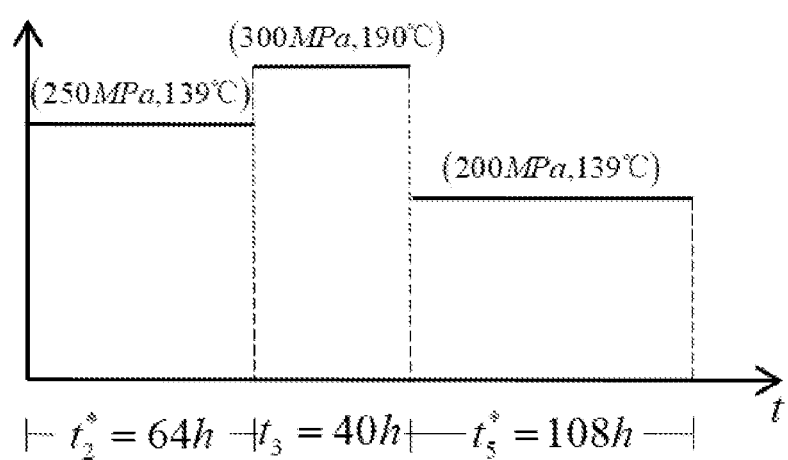
FIG. 9 shows the three-grade creep load after the consistent failure mode and equivalent acceleration in an embodiment of the present application.
Figure 10:
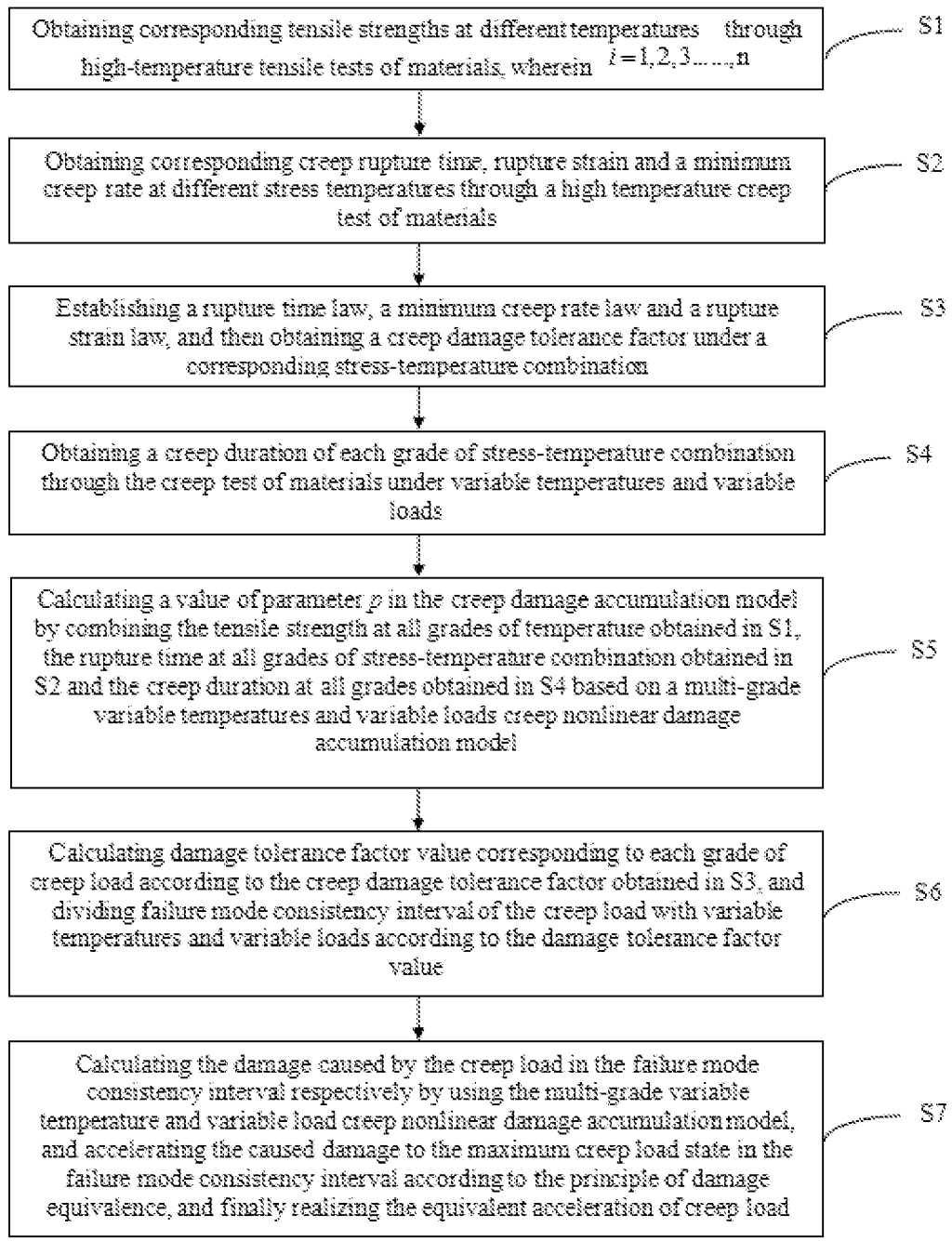
FIG. 10 is a flowchart of the creep load equivalent acceleration method based on consistent failure mode in an embodiment of the present application.
Figure 11:
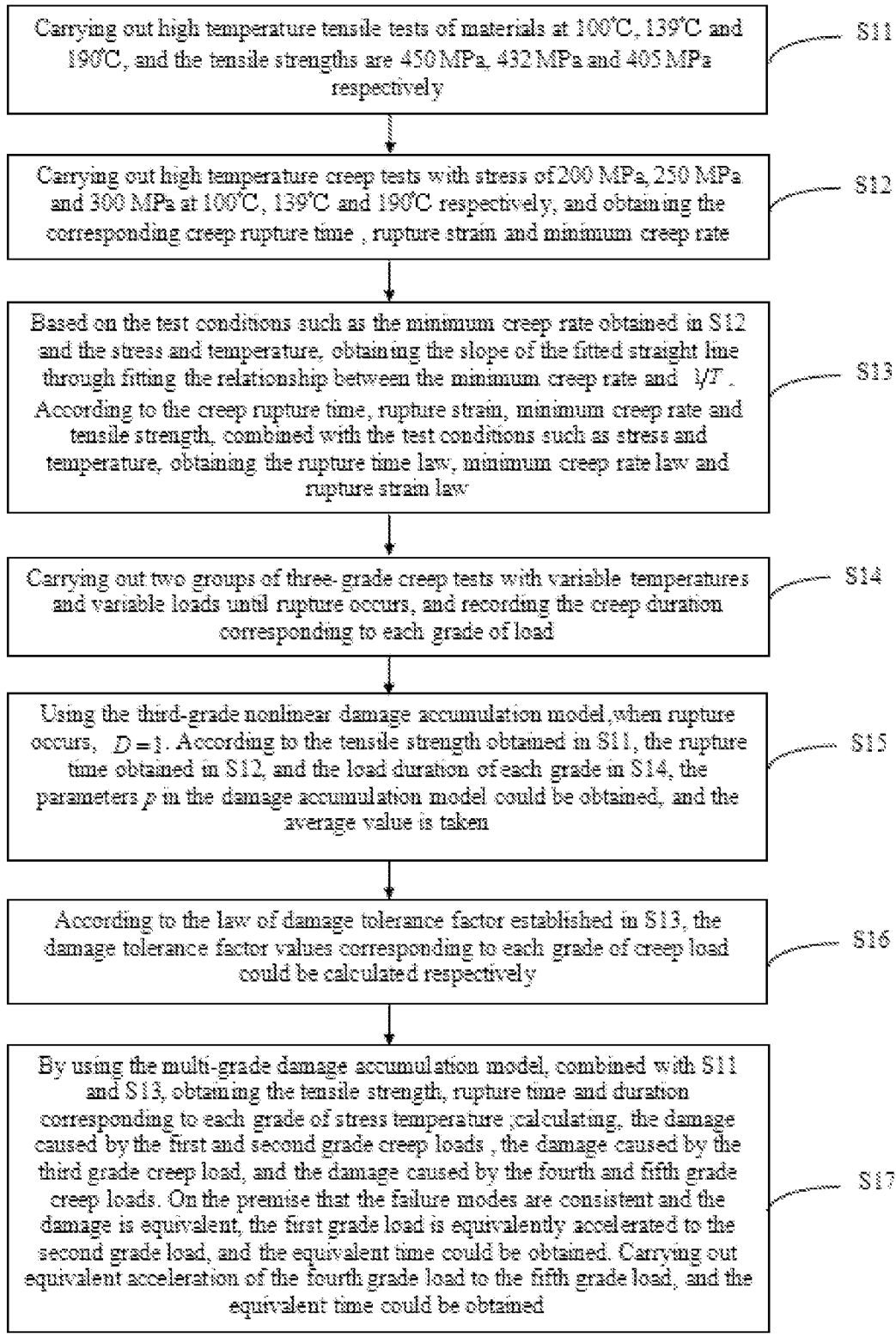
FIG. 11 is a flowchart of the creep load equivalent acceleration method based on consistent failure mode applied to the creep load equivalent acceleration of stainless steel materials in an embodiment of the present application.

S17, by using the multi-grade damage accumulation model $$D = \left(\left(\left(\frac{t_1}{t_{f1}}\right)^{\varphi_{1,2}} + \frac{t_2}{t_{f2}}\right)^{\varphi_{2,3}} + \frac{t_3}{t_{f3}}\right)^{\varphi_{3,4}} + \ldots + \frac{t_{n-1}}{t_{fn-1}}\right)^{\varphi_{n-1,n}} + \frac{t_n}{t_{fn}},$$

where $$\varphi_{n-1,n} = \ln\left(\frac{-\ln(\sigma_n/\sigma_{bn})}{-p}\right) \bigg/ \ln\left(\frac{-\ln(\sigma_{n-1}/\sigma_{bn-1})}{-p}\right),$$

p=0.55, combined with S11 and S13, obtaining the tensile strength $\sigma_b$, rupture time $t_f$ and duration $t_i$ corresponding to each grade of stress temperature ($\sigma_i, T_i$); through calculating, the damage caused by the first and second grade creep loads is 0.23, the damage caused by the third grade creep load is 0.11, and the damage caused by the fourth and fifth grade creep loads is 0.34. On the premise that the failure modes are consistent and the damage is equivalent, the first grade load is equivalently accelerated to the second grade load, so $$0.23 = \frac{t_2^*}{t_{f2}}$$

could be obtained, and the equivalent time $t_2^*$=64 h could be obtained. Carrying out equivalent acceleration of the fourth grade load to the fifth grade load, $$0.34 = \frac{t_5^*}{t_{f5}}$$

can be obtained, and the equivalent time $t_5^*$=108 h could be obtained. Creep loads based on consistent failure mode and damage equivalence is shown in FIG. 9, and the creep time is accelerated from 340 h to 212 h.

The above is only the preferred embodiment of the present application. It should be pointed out that for ordinary technicians in the technical field, without departing from the principle of the present application, several improvements and embellishments could be made, which should also fall in the protection scope of the present application.

What is claimed is:

1. An equivalent acceleration method of creep loads based on a consistent failure mode, comprising:

S1, obtaining corresponding tensile strengths $\sigma_{bi}$ at different temperatures $T_i$ through high-temperature tensile tests of materials, wherein i=1, 2, 3 . . . , n;

S2, obtaining corresponding creep rupture time $t_f$, rupture strain $\varepsilon_f$ and a minimum creep rate $\dot{\varepsilon}_m$ at different stress temperatures $(\sigma_i,T_i)$ through a high temperature creep test of materials;

S3, establishing a rupture time law, a minimum creep rate law and a rupture strain law, and then obtaining a creep damage tolerance factor under a corresponding stress-temperature $(\sigma_i,T_i)$ combination;

wherein based on the creep rupture time $t_f$, the rupture strain $\varepsilon_f$, the minimum creep rate $\dot{\varepsilon}_m$ the tensile strength $\sigma_b$ and the temperature T obtained in S2, the rupture time law $$\frac{\sigma}{\sigma_b} = \exp\left[-k_1\left[t_f * e^{\frac{Q_c^*}{RT}}\right]^u\right],$$

the minimum creep rate law $$\frac{\sigma}{\sigma_b} = \exp\left[-k_2\left[\dot{\varepsilon}_m * e^{\frac{Q_c^*}{RT}}\right]^v\right]$$

and the rupture strain law $$\varepsilon_f = \frac{\varepsilon_{fmax} + \varepsilon_{fmin}(\dot{\varepsilon}_m/\dot{\varepsilon}_{m,cr})^{-\alpha}}{1 + (\dot{\varepsilon}_m/\dot{\varepsilon}_{m,cr})^{-\alpha}}$$

are established, and then the creep damage tolerance factor $\lambda=\varepsilon_f/(\dot{\varepsilon}_m*t_f)$ under the corresponding stress-temperature combination $(\sigma_i,T_i)$ is obtained;

wherein e is a natural index, $k_1$, $k_2$, u, v, $\alpha$ are fitting parameters, R is a gas constant R=8.314 J/(mol*K), $Q_c^*$ is creep activation energy, $\varepsilon_{f\,max}$ and $\varepsilon_{f\,min}$ are a maximum rupture strain and a minimum rupture strain respectively, and $\dot{\varepsilon}_{m,cr}$ is a median fracture strain, a minimum creep rate value corresponding to $$\varepsilon_f = \frac{\varepsilon_{fmax} + \varepsilon_{fmin}}{2};$$

S4, obtaining a creep duration $t_i$ of each grade of stress-temperature $(\sigma_i,T_i)$ combination through a creep test of materials under variable temperatures and variable loads;

S5, calculating a value of parameter p in a multi-grade variable temperature and variable load creep nonlinear damage accumulation model by combining the tensile strengths $\sigma_{bi}$ at all grades of temperature obtained in S1, rupture time $t_{fi}$ at all grades of stress-temperature $(\sigma,T_i)$ combination obtained in S2 and the creep duration $t_i$ at all grades obtained in S4 based on a multi-grade variable temperature and variable load creep nonlinear damage accumulation model;

wherein the multi-grade variable temperature and variable load creep nonlinear damage accumulation model is:

$$D = \left(\left(\left(\left(\frac{t_1}{t_{f1}}\right)^{\varphi_{1,2}} + \frac{t_2}{t_{f2}}\right)^{\varphi_{2,3}} + \frac{t_3}{t_{f3}}\right)^{\varphi_{3,4}} + \ldots + \frac{t_{n1}}{t_{fn-1}}\right)^{\varphi_{n-1,n}} + \frac{t_n}{t_{fn}}$$

wherein $$\varphi_{n-1,n} = \ln\left(\frac{-\ln(\sigma_n/\sigma_{bn})}{-p}\right)/\ln\left(\frac{-\ln(\sigma_{n-1}/\sigma_{bn-1})}{-p}\right);$$

S6, calculating a damage tolerance factor value $\lambda$ corresponding to each grade of creep load according to the creep damage tolerance factor obtained in S3, and dividing failure mode consistency interval of the creep load with variable temperatures and variable loads according to the damage tolerance factor value $\lambda$;

wherein when $1<\lambda<2.5$, the failure mode is a grain boundary cavity, when $2.5<\lambda<5$, the failure mode is necking, and when $\lambda>5$ the failure mode is unstable microstructure dominated by coarse precipitates; adjacent creep loads with variable temperatures and variable loads with damage tolerance factors between $1<\lambda<2.5$, $2.5<\lambda<5$, and $\lambda>5$ are equivalently accelerated to a maximum creep state of an uniform damage interval, so as to realize a division of the failure mode consistency interval of the creep loads with variable temperatures and variable loads; and S7, calculating damage caused by the creep load in the failure mode consistency interval respectively by using the multi-grade variable temperature and variable load creep nonlinear damage accumulation model, and accelerating caused damage to a maximum creep load state in the failure mode consistency interval according to a principle of damage equivalence, and finally realizing the equivalent acceleration of creep load.

2. The equivalent acceleration method of the creep loads based on the consistent failure mode according to claim 1, wherein in S1, the high-temperature tensile test of materials is carried out on an electro-hydraulic servo fatigue tester.

3. The equivalent acceleration method of the creep loads based on the consistent failure mode according to claim 1, wherein in S2, the high-temperature creep test of materials is carried out on a creep tester, and a series of creep tests under different stress-temperature $(\sigma_i,T_i)$ combinations are carried out.

4. The equivalent acceleration method of the creep loads based on the consistent failure mode according to claim 1, wherein in S4, the creep test of materials under variable temperatures and variable loads is carried out on a creep tester, and the creep test under variable temperatures and variable loads under multi-grade stress-temperature combination is carried out until the creep rupture of the materials occurs, and the creep duration under each grade of stress-temperature $(\sigma_i,T_i)$ combination is obtained.

5. The equivalent acceleration method of the creep loads based on the consistent failure mode according to claim 4, wherein in S4, the creep test of materials under variable temperatures and variable loads adopts a manual or a computer control mode to realize a change of stress and temperatures.

6. The equivalent acceleration method of the creep loads based on the consistent failure mode according to claim 1, wherein in S5, p is an average value of results obtained from multiple tests.

* * * * *